(12) United States Patent
Schmidt

(10) Patent No.: US 10,457,411 B2
(45) Date of Patent: Oct. 29, 2019

(54) LIGHTNING STRIKE DISPERSION FOR COMPOSITE AIRCRAFT STRUCTURES

(71) Applicant: Goodrich Corporation, Charlotte, NC (US)

(72) Inventor: Ryan Schmidt, Gilbert, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 825 days.

(21) Appl. No.: 15/186,116

(22) Filed: Jun. 17, 2016

(65) Prior Publication Data

US 2017/0361944 A1 Dec. 21, 2017

(51) Int. Cl.
*B64D 45/02* (2006.01)
*B32B 3/26* (2006.01)
*B32B 5/02* (2006.01)
*B32B 7/02* (2019.01)
*B32B 15/00* (2006.01)
(Continued)

(52) U.S. Cl.
CPC .............. *B64D 45/02* (2013.01); *B29C 70/86* (2013.01); *B29C 70/885* (2013.01); *B32B 3/266* (2013.01); *B32B 5/028* (2013.01); *B32B 7/02* (2013.01); *B32B 15/00* (2013.01); *B32B 15/14* (2013.01); *B32B 37/144* (2013.01); *B32B 37/15* (2013.01); *B32B 38/0012* (2013.01); *B32B 2262/103* (2013.01); *B32B 2307/202* (2013.01); *B32B 2307/206* (2013.01); *B32B 2311/00* (2013.01);
(Continued)

(58) Field of Classification Search
CPC ...... B64D 45/02; B64D 25/14; B29C 70/885; B29C 70/86; B32B 38/0012; B32B 37/15; B32B 7/02; B32B 15/00; B32B 15/14; B32B 37/144; B32B 3/266; B32B 5/028; B32B 2262/103; B32B 2307/202; B32B 2307/206; B32B 2311/00; B32B 2571/00; B32B 2605/18

See application file for complete search history.

(56) References Cited

U.S. PATENT DOCUMENTS 4,542,056 A 9/1985 Anglin
4,920,449 A 4/1990 Covey
(Continued)

FOREIGN PATENT DOCUMENTS

EP 0248122 A2 12/1987
EP 0518461 A1 12/1992
(Continued)

OTHER PUBLICATIONS

Extended European Search Report dated Nov. 16, 2017 in European Application No. 17176469.9.

*Primary Examiner* — Valentina Xavier
(74) *Attorney, Agent, or Firm* — Snell & Wilmer L.L.P.

(57) ABSTRACT

A lightning strike dispersion structure may include a composite component having an outboard surface, wherein the composite component is electrically nonconductive. The lightning strike dispersion structure may include a metal sheet coupled to and extending across a minority portion of the outboard surface of the composite component, wherein the metal sheet is electrically conductive. The lightning strike dispersion structure may also include a metal stud coupled to and in electrical contact with the metal sheet, the metal stud extending completely through the composite component, wherein the metal stud is electrically conductive.

16 Claims, 7 Drawing Sheets

(51) Int. Cl.
*B32B 15/14* (2006.01)
*B32B 37/14* (2006.01)
*B32B 37/15* (2006.01)
*B32B 38/00* (2006.01)
*B29C 70/86* (2006.01)
*B29C 70/88* (2006.01)
*B64D 25/14* (2006.01)

(52) U.S. Cl.
CPC ....... *B32B 2571/00* (2013.01); *B32B 2605/18* (2013.01); *B64D 25/14* (2013.01)

(56) References Cited

U.S. PATENT DOCUMENTS

| | | | |
|---|---|---|---|
| 5,845,872 A * | 12/1998 | Pridham | B64D 45/02 |
| | | | 244/1 A |
| 7,886,439 B2 * | 2/2011 | Braden | H01R 4/646 |
| | | | 244/1 A |
| 8,436,243 B2 * | 5/2013 | Gattus | H02G 13/00 |
| | | | 174/2 |
| 8,462,481 B2 | 6/2013 | Lambert et al. | |
| 8,699,203 B2 * | 4/2014 | Le Louarn | B64D 45/02 |
| | | | 361/117 |
| 8,918,993 B2 | 12/2014 | Braden et al. | |
| 2011/0255205 A1 * | 10/2011 | Lopez-Reina Torrijos | |
| | | | B29C 70/885 |
| | | | 361/218 |
| 2016/0016673 A1 | 1/2016 | Anderson et al. | |

FOREIGN PATENT DOCUMENTS

| | | | | |
|---|---|---|---|---|
| EP | 0976653 A1 * | 2/2000 | | B64D 45/02 |
| EP | 0976653 A1 | 2/2002 | | |
| EP | 1484245 A1 * | 12/2004 | | B29C 70/885 |
| EP | 1484245 A1 | 12/2004 | | |
| WO | WO 9858840 A1 | 12/1998 | | |

* cited by examiner

LIGHTNING STRIKE DISPERSION FOR COMPOSITE AIRCRAFT STRUCTURES

FIELD

The present disclosure relates to systems and methods for lightning strike dispersion, and more specifically, to transferring electricity received by an aircraft from a lightning strike.

BACKGROUND

Certain components of an aircraft, such as packboards, are often constructed from composite materials. Such composite elements are often electrically nonconductive and thus prevent or at least hinder the transfer of electricity to a main electrical ground of an aircraft in the event of a lightning strike or other similar event. Further, because the composite elements are electrically nonconductive, a lightning strike could damage the composite element and/or the contents of the composite element, thus adversely affecting the performance and safety of the aircraft.

SUMMARY

In various embodiments, a lightning strike dispersion structure is disclosed. The lightning strike dispersion structure may include a composite component having an outboard surface, wherein the composite component is electrically nonconductive. The lightning strike dispersion structure may include a metal sheet coupled to and extending across a minority portion of the outboard surface of the composite component, wherein the metal sheet is electrically conductive. The lightning strike dispersion structure may also include a metal stud coupled to and in electrical contact with the metal sheet, the metal stud extending completely through the composite component, wherein the metal stud is electrically conductive.

In various embodiments, the lightning strike dispersion structure may also include a metal mesh coupled to and extending across a majority portion of the outboard surface of the composite component, wherein the metal mesh is electrically conductive and the majority portion of the outboard surface of the composite component is inclusive of the minority portion of the outboard surface of the composite component such that the metal mesh extends across and is in electrical contact with the metal sheet.

In various embodiments, the metal mesh may be in direct physical contact with the metal sheet. In various embodiments, the majority portion of the outboard surface of the composite component may have a surface area that is at least 10 times larger than a surface area of the minority portion of the outboard surface of the composite component. In various embodiments, the metal mesh is embedded in an exterior surface material of an aircraft. In various embodiments, the minority portion of the outboard surface of the composite component has a surface area that is at least 2 times larger than a cross-sectional area of a head of the metal stud.

In various embodiments, the metal stud, when coupled to the metal sheet, may be non-rotatable about a longitudinal axis of the metal stud. The metal stud may be a self-clinching stud that is coupled to the metal sheet. In various embodiments, a head of the metal stud is flush with a surface of the metal sheet. The metal stud may be permanently integrated with the composite component.

In various embodiments, a longitudinal axis of the metal stud extends perpendicular to plies of the composite component. In various embodiments, the metal stud may be non-structural and thus may be free of a structural load. The minority portion of the outboard surface of the composite component may have a surface area that is about 1 square inch.

In various embodiments, a packboard of an aircraft is disclosed. The packboard may include a composite housing having an inboard surface and an outboard surface, wherein the composite housing is electrically nonconductive. The packboard may also include a metal sheet coupled to and extending across a minority portion of the outboard surface of the composite housing, wherein the metal sheet is electrically conductive. The packboard may also include a metal stud comprising a head and a tip longitudinally opposite the head. The metal stud may be electrically conductive and may extend through the composite housing. The head of the metal stud may be coupled to and in electrical contact with the metal sheet and the tip of the metal stud may protrude from the inboard surface of the composite housing. Further, the tip of the metal stud may be configured to be electrically connected to an electrical ground of the aircraft.

In various embodiments, the packboard further includes a metal mesh coupled to and extending across a majority portion of the outboard surface of the composite housing, wherein the metal mesh is electrically conductive and the majority portion of the outboard surface of the composite housing is inclusive of the minority portion of the outboard surface of the composite housing such that the metal mesh extends across and is in electrical contact with the metal sheet. In various embodiments, at least the tip of the metal stud may be threaded and may be configured to couple with a threaded nut for electrically connecting the metal stud to the electrical ground of the aircraft. In various embodiments, the metal stud may be permanently integrated with the composite housing.

In various embodiments, a method of manufacturing a packboard is disclosed. The method may include coupling a head of a metal stud that is electrically conductive to a metal sheet that is electrically conductive such that the metal stud is in electrical contact with the metal sheet and the head of the metal stud is substantially flush with a first surface of the metal sheet. The method may also include laying plies of electrically nonconductive material across a second surface, opposite the first surface, of the metal sheet. Laying the plies may include molding the plies to shape a packboard housing form having an inboard surface and an outboard surface, the second surface of the metal sheet extending across a minority portion of the outboard surface of the packboard housing form. Laying the plies may also include extending the metal stud completely through the plies and coupling a metal mesh that is electrically conductive across the first surface of the metal sheet and across a majority portion of the outboard surface of the packboard housing form, wherein the metal mesh is in electrical contact with the first surface of the metal sheet. The method may further include curing the plies to set the packboard housing form.

In various embodiments, coupling the head of the metal stud to the metal sheet occurs before laying the plies and before curing the plies. In various embodiments, a longitudinal axis of the metal stud is maintained perpendicular to the plies while laying the plies.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. Different cross-hatching is used throughout the figures to denote different parts but not necessarily to denote the same or different materials.

Figure 1:
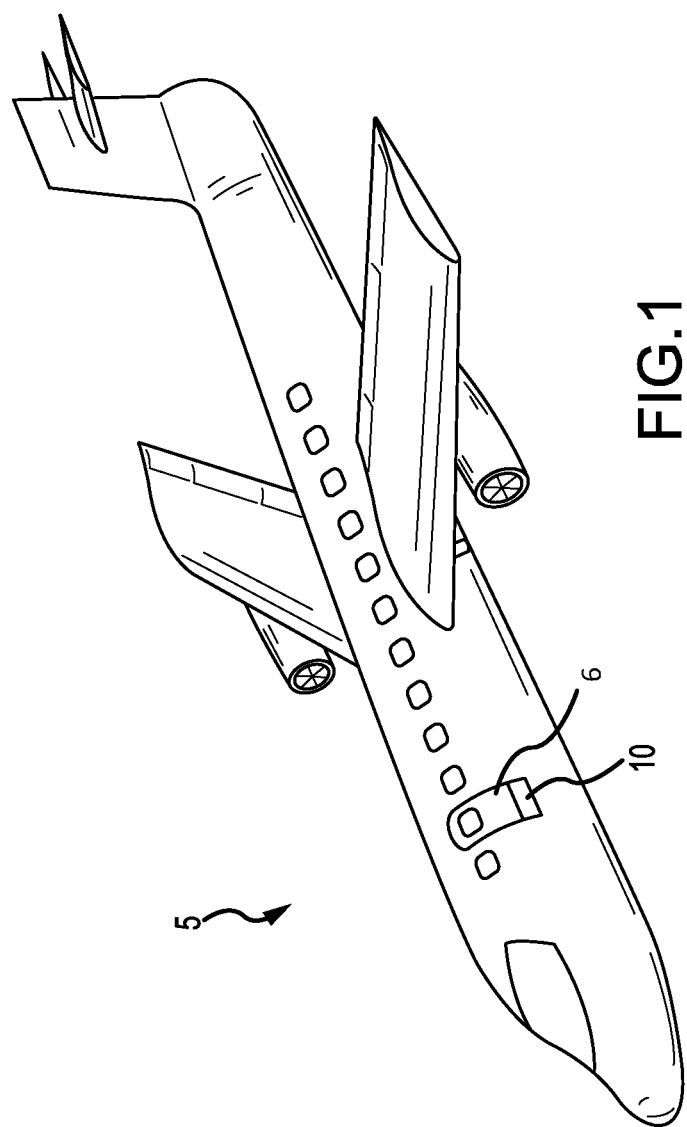
FIG. 1 illustrates a perspective view of an aircraft having an exterior mounted composite component, in accordance with various embodiments.

FIG. 1 illustrates a perspective view of an aircraft 5 having an exterior mounted composite component 10, in accordance with various embodiments. Referring to FIG. 1, an exemplary aircraft 5 is shown, in accordance with various embodiments. Aircraft 5 may include a fuselage with wings fixed to the fuselage. An emergency exit door 6 may be disposed on the fuselage to allow passengers to exit the aircraft 5. Although not depicted in FIG. 1, the emergency exit door 6, in various embodiments, may be situated over the wings of the aircraft 5 such that passengers exiting through the emergency exit door 6 can exit onto the wing(s). The exterior mounted composite component 10 may be, for example, a packboard 100 (with brief reference to FIG. 2) configured to store an evacuation slide assembly. In various embodiments, the composite component 10 may be a panel or other exterior mounted composite structure of the aircraft 5.

As used herein, the term composite component 10 refers to an electrically nonconductive structure. Electrically nonconductive elements disposed on or near the exterior of the aircraft 5 may present performance or safety liabilities in the event of a lightning strike. Accordingly, the present disclosure relates to transferring electricity from the exterior of the aircraft 5, through the electrically nonconductive composite component 10, and to the main electrical ground of the aircraft 5.

As used herein, the term "composite" refers to layers or fibers set in a resin matrix. In other words, the term "composite" may refer to carbon fibers, glass fibers, aramid fibers, and/or plastic fibers, among others, held together and set in a resin or epoxy matrix.

Figure 2:
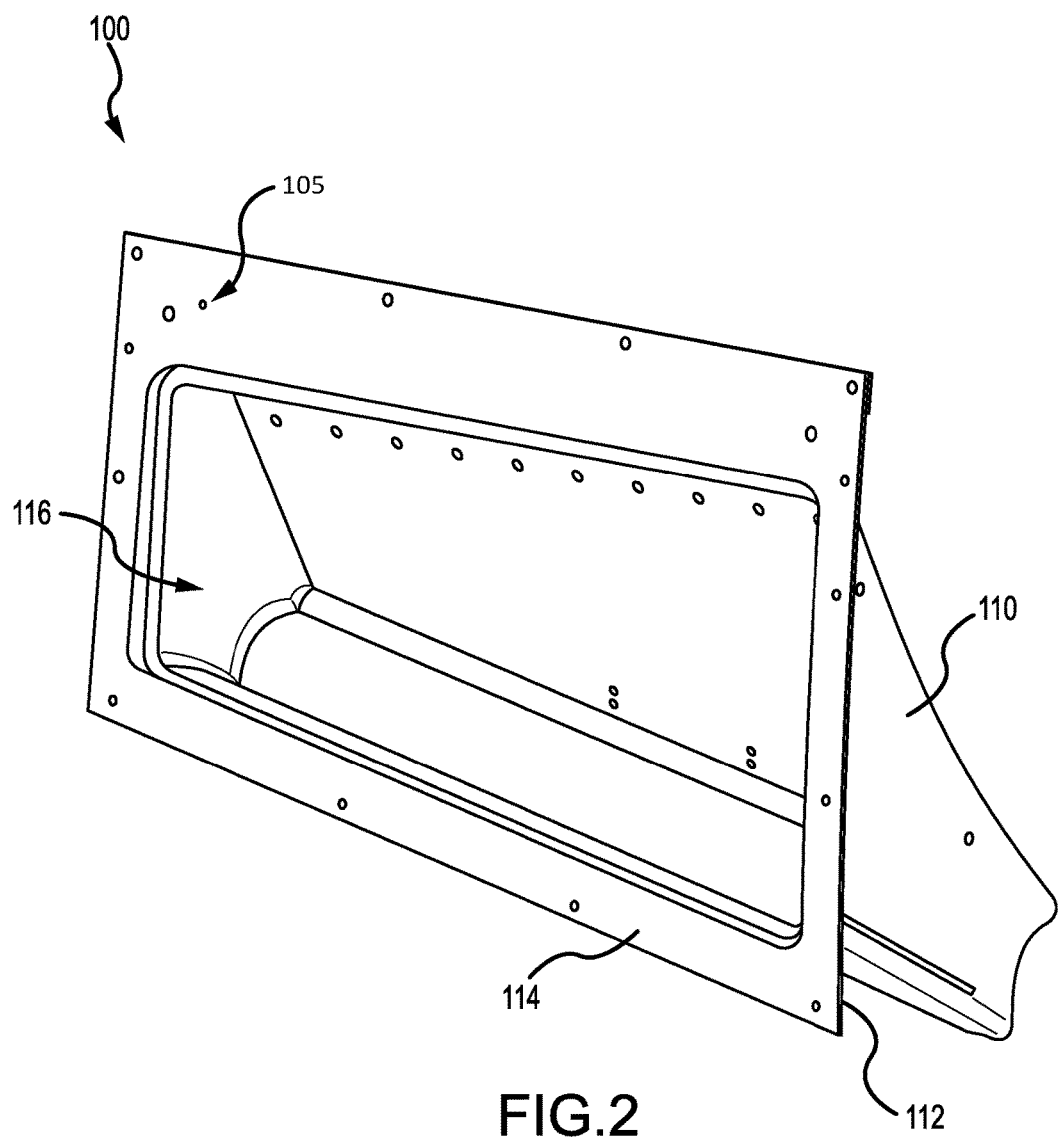
FIG. 2 illustrates a perspective view of a packboard, in accordance with various embodiments.
Figure 3:
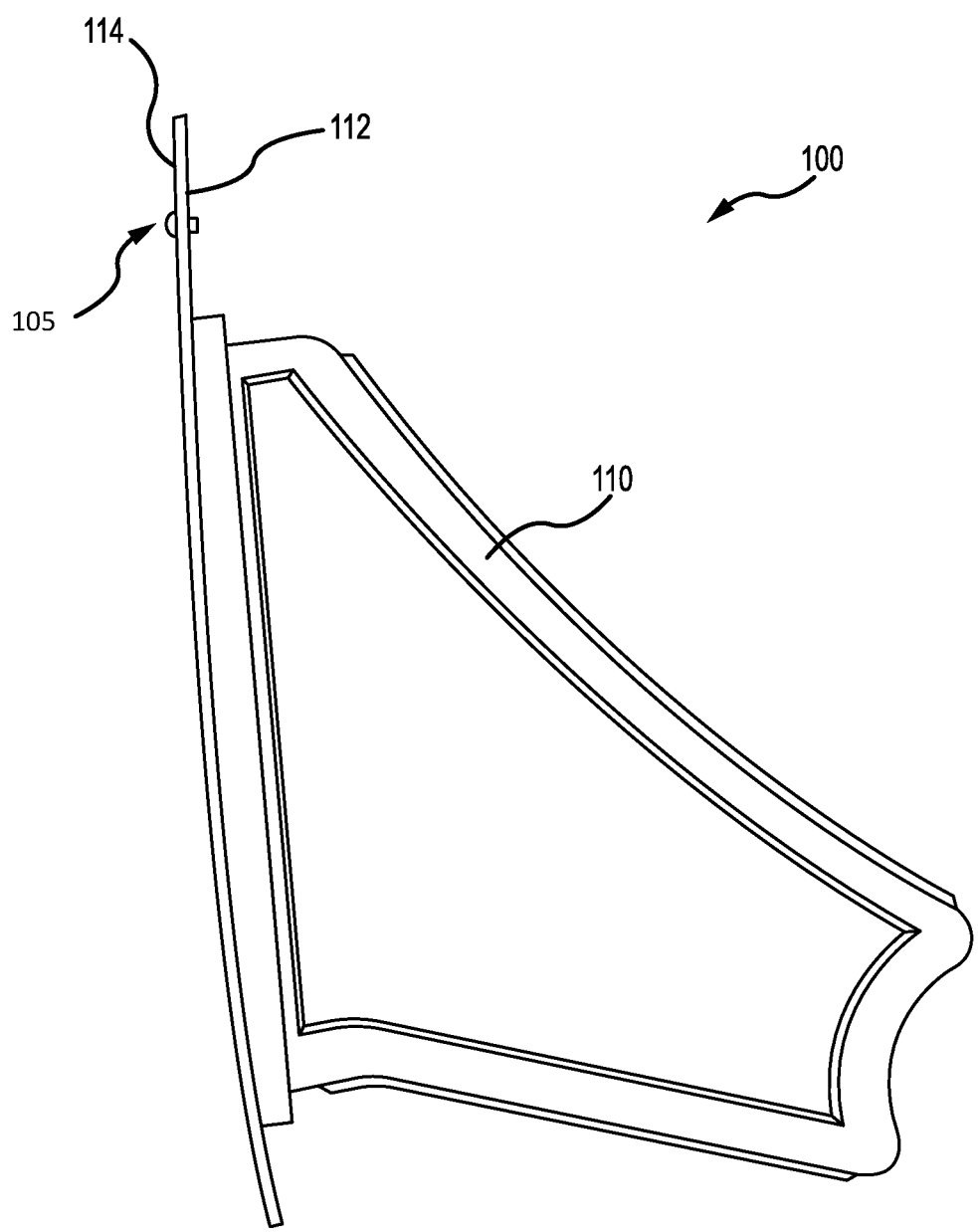
FIG. 3 illustrates a side view of the packboard of FIG. 2, in accordance with various embodiments.

In various embodiments, and with reference to FIGS. 2 and 3, a lightning strike dispersion structure 105 for a packboard 100 is disclosed. The lightning strike dispersion structure 105 includes various components, described below in greater detail, that facilitate the transfer of electricity through the packboard 100 to the main electrical ground of the aircraft 5. As mentioned above, the packboard 100 may be a fuselage-mounted container within which, for example, an evacuation slide assembly is housed. In other words, the packboard 100 generally defines a chamber 116 for storing and/or housing one or more items or assemblies. In various embodiments, an access panel may extend across the opening of the chamber 116 to retain the contents of the packboard 100. In various embodiments, for example, an evacuation slide assembly may jettison the access panel and deploy the inflatable evacuation slide in response to the emergency exit door 6 opening.

Figure 4:
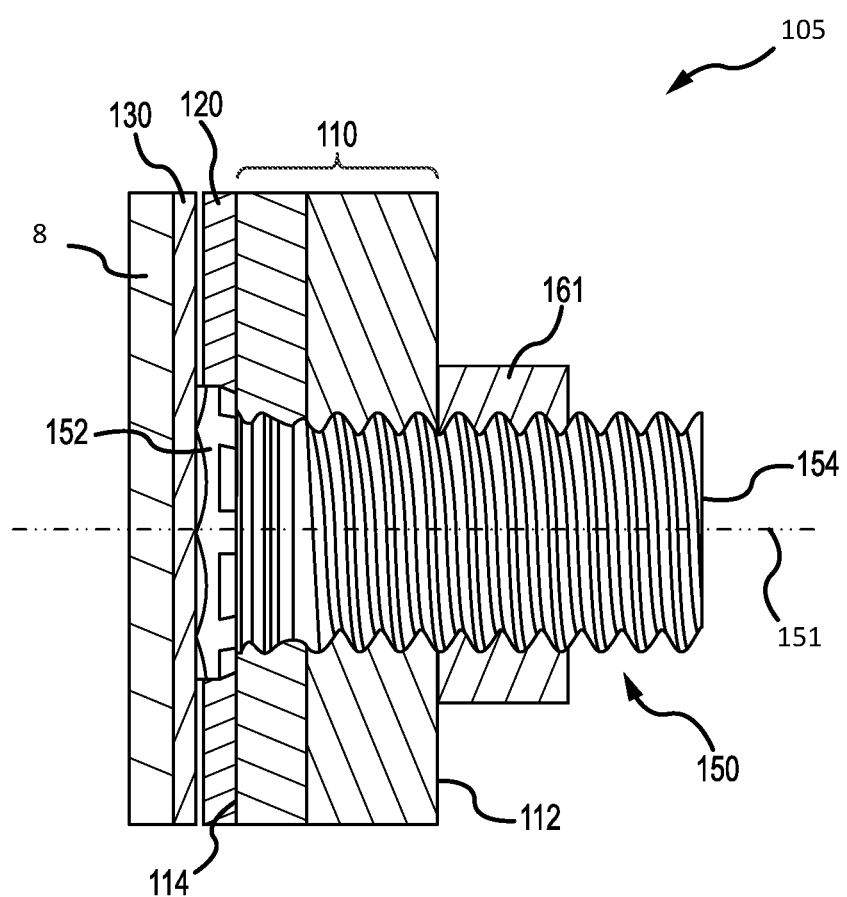
FIG. 4 illustrates a cross-section view of a metal stud extending through an exterior mounted composite component, in accordance with various embodiments.

The lightning strike dispersion structure 105 for the packboard 100 includes a composite housing 110, a metal sheet 120 (with reference to FIG. 4), a metal mesh 130 (with reference to FIG. 4), and a metal stud 150 (with reference to FIG. 4). These components are described in greater detail below. Throughout the present disclosure, the terms "composite component 10," "packboard 100," and "composite housing 110" refer to electrically nonconductive material. That is, the term "packboard 100" specifically refers to one type of "composite component 10" and the term "composite housing 110" specifically refers to the structural body that forms and defines the chamber 116 of the packboard 100. Thus, while numerous details and various embodiments are included herein with reference to a packboard 100, it is recognized that the lightning strike dispersion subject matter of the present disclosure may be applied and implemented with other, non-packboard-type composite components 10.

The metal sheet 120, the metal mesh 130, and the metal stud 150 may be made from electrically conductive metal materials. For example, the metal sheet 120, the metal mesh 130, and the metal stud 150 may be made from aluminum, steel, copper, nickel, tin, brass, tungsten, or iron, among others, or alloys thereof. The metal sheet 120, the metal mesh 130, and the metal stud 150 may be the same material or they may be different.

The packboard 100 has an inboard surface 112 (with reference to FIG. 3) and an outboard surface 114. The term "outboard surface 114" refers to surfaces of the packboard 100 that are disposed exterior to the aircraft 5 while the term "inboard surface" refers to surfaces of the composite component 10 that are not disposed exterior to the aircraft. For example, the inboard surface 112 refers to surfaces that are disposed and/or face inward relative to the exterior skin of the aircraft. In various embodiments, the metal stud 150 extends through the composite housing 110 of the packboard 100 from the outboard surface 114 to the inboard surface 112. The metal stud 150 is electrically conductive.

Figure 5:
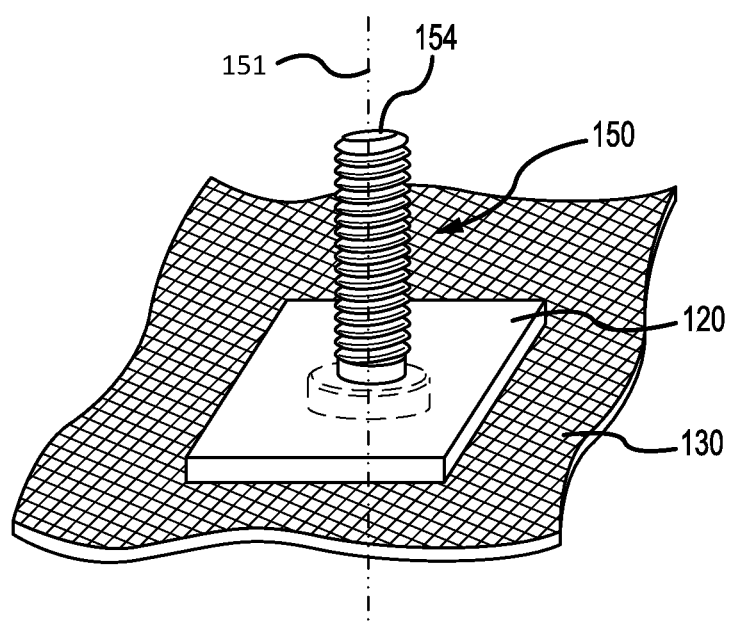
FIG. 5 illustrates a partial perspective view of a metal stud coupled to a metal sheet, in accordance with various embodiments.

In various embodiments, and with reference to FIGS. 4 and 5, further details of the lightning strike dispersion structure 105 are illustrated. FIG. 4 illustrates a cross-section view of the metal stud 150 extending through the composite housing 110. While FIG. 4 shows the composite housing 110 having two layers, in various embodiments the composite housing 110 may have more than two layers of composite material. In various embodiments, the metal stud 150 may include a head 152 and a tip 154.

In various embodiments, the metal sheet 120 is disposed adjacent a portion of the outboard surface 114 of the composite housing 110. In various embodiments, the head 152 of the metal stud 150 may be directly coupled to the metal sheet 120. For example, the metal stud 150 may be a self-clinching fastener and the head 152 of the metal stud 150 may be mounted and/or fixed to the metal sheet 120 so as to be non-rotatable about a longitudinal axis of the metal stud 150. In various embodiments, the metal sheet 120 may be a ductile material that allows the head 152 of the metal stud 150 to be non-rotatably embedded in the metal sheet 120. In various embodiments, the head 152 of the metal stud 150 is substantially flush with an exterior facing surface of the metal sheet 120.

In various embodiments, and as described in more detail below with reference to FIG. 7, the metal stud 150 may be permanently integrated with the metal sheet 120 and/or the composite housing 110 during the manufacture of the packboard 100. In various embodiments, the metal stud 150 may be non-structural and thus may not support a structural load. In other words, the packboard 100 may be mechanically and structurally coupled to the aircraft 5 via fasteners or weldments other than the metal stud 150.

The metal sheet 120 is electrically conductive and, according to various embodiments, may extend across a minority portion of the outboard surface 114 of the composite housing 110. In other words, the term "minority portion" refers to the portion (e.g., part of a whole) of the outboard surface 114 of the composite housing 110 across which the metal sheet 120 is disposed and thus also refers to the areal dimensions of a surface of the metal sheet 120 extending parallel to the outboard surface 114. In various embodiments, the minority portion may be less than half the outboard surface 114 of the composite housing 110. In various embodiments, the minority portion may be between about 0.5 and 25 square inches. In various embodiments, the minority portion may be between about 1 and 9 square inches. In various embodiments, the minority portion may be about 1 square inch. In various embodiments, the minority portion of the outboard surface 114 of the composite housing 110 has a surface area that is at least 2 times larger than a cross-sectional area of the head 152 of the metal stud.

The metal mesh 130 is electrically conductive and, according to various embodiments, extends across a majority portion of the outboard surface 114 of the composite housing 110. The term "majority portion" refers to the portion (e.g., part of a whole) of the outboard surface 114 of the composite housing 110 across which the metal mesh 130 is disposed and thus also refers to the areal dimensions of a surface of the metal mesh 130 extending parallel to the outboard surface 114. The majority portion is inclusive of the minority portion. That is, according to various embodiments, the metal mesh 130 overlaps the metal sheet 120 so that the metal mesh 130 is in electrical contact with the metal sheet 120. In various embodiments, the metal mesh 130 is in direct physical contact with the metal sheet 120.

In various embodiments, the majority portion may be more than half of the outboard surface 114 of the composite housing 110 and thus the metal mesh 130 may extend across more than half of the exterior surface area of the composite housing 110. In various embodiments, the majority portion of the outboard surface 114 has a surface area that is at least 10 times larger than a surface area of the minority portion of the outboard surface 114.

In various embodiments, the metal mesh 130 may extend across substantially the entire outboard surface 114 of the composite housing 110. In various embodiments, the metal mesh 130 may be coupled with and/or embedded into an outer coating, skin, or paint. In various embodiments, the metal mesh 130 may electrically connect with or may be continuous with a similar metal mesh that extends across the exterior surface of the aircraft 5 for lightning strike electricity dispersion. Thus, electricity from a lightning strike may conduct through the metal mesh 130, through the metal sheet 120, through the metal stud 150, and to the main electrical ground of the aircraft 5. Thus, the metal sheet 120 may facilitate electrical conduction between the metal stud 150 and the metal mesh 130. The metal sheet 120 may also provide a secure medium to which the metal stud 150 is non-rotatably affixed.

Figure 6:
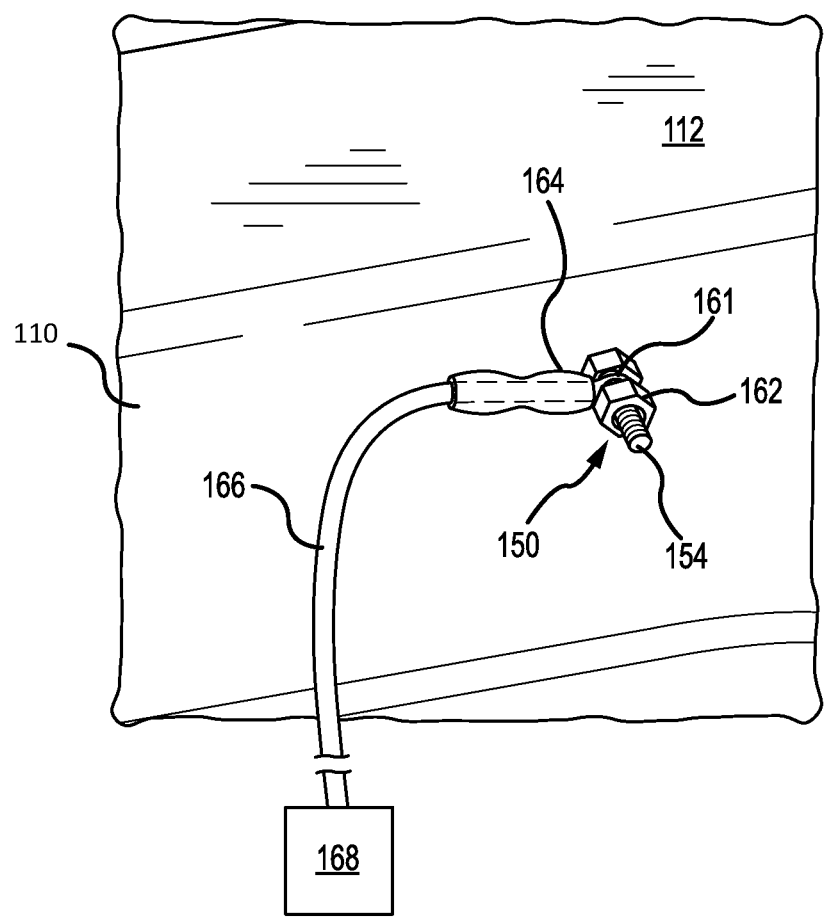
FIG. 6 illustrates a perspective view of an electrically conductive cable coupled to the metal stud, in accordance with various embodiments.

In various embodiments, and with reference to FIG. 6, an electrically conductive cable 166 for electrically connecting the tip 154 (or at least a portion of tip 154) of the metal stud 150 with the main electrical ground 168 of the aircraft 5 is disclosed. FIG. 6 illustrates a partial view of the inboard surface 112 of the composite housing 110. Extending from the inboard surface 112 of the composite housing 110 is the tip 154 of the metal stud 150. In various embodiments, the tip 154 of the metal stud 150 may be threaded and one or more threaded nuts 161, 162 may be threadably engaged on the metal stud 150. For example, the electrically conductive cable 166 may have a coupler 164 that engages the tip 154 of the metal stud 150 and the threaded nut(s) 161, 162 may secure the coupler 164 in place to maintain the electrical connection between the electrically conductive cable 166 and the metal stud 150. In various embodiments, a nut may retain the coupler 164 of the electrically conductive cable 166 between the nut and the inboard surface 112 of the composite housing 110. In various embodiments, the coupler 164 may be retained coupled to the metal stud 150 between one or more nuts.

Figure 7:
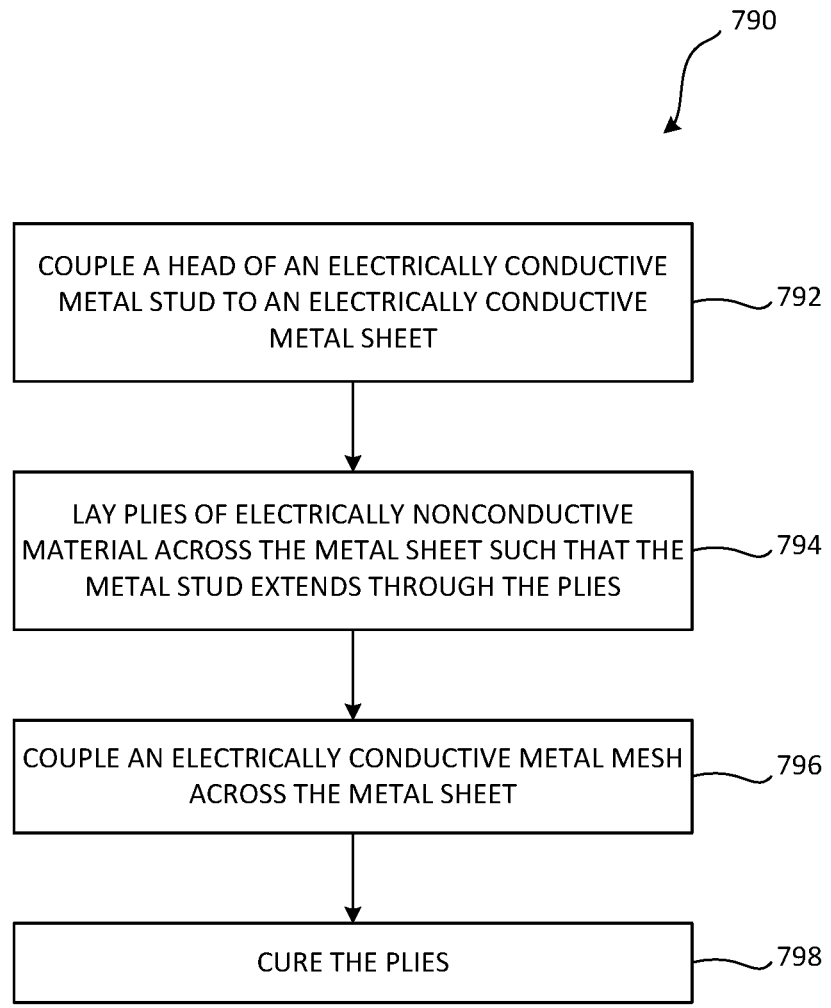
FIG. 7 illustrates a schematic flow chart diagram of a method for manufacturing a packboard, in accordance with various embodiments.

FIG. 7 illustrates a schematic flow chart diagram of a method 790 for manufacturing the packboard 100, in accordance with various embodiments. The method 790 may include coupling the head 152 of the metal stud 150 to the metal sheet 120 such that the metal stud 150 is in electrical contact with the metal sheet 120 and the head 152 of the metal stud 150 is substantially flush with a first surface of the metal sheet 120 (step 792). The method 790 may further include laying plies of electrically nonconductive material across a second surface, opposite the first surface, of the metal sheet 120 (step 794). According to various embodiments, laying the plies includes molding the plies to shape a packboard housing form having an inboard surface and an outboard surface. The second surface of the metal sheet 120 may extend across a minority portion of the outboard surface of the packboard housing form. Laying the plies may also include extending the metal stud 150 completely through the plies.

The method 790 further includes, according to various embodiments, coupling the metal mesh 130 across the first surface of the metal sheet 120 and across a majority portion of the outboard surface of the packboard housing form, wherein the metal mesh 130 is in electrical contact with the first surface of the metal sheet 120 (step 796). The method 790 also includes curing the plies to set the packboard housing form (step 798).

In various embodiments, coupling the head 152 of the metal stud 150 to the metal sheet 120 (step 792) occurs before laying the plies (step 794) and before curing the plies (step 798). In various embodiments, extending the metal stud 150 completely through the plies occurs as the plies are being laid and before the plies are cured (step 798). In various embodiments, a longitudinal axis of the metal stud 150 is maintained perpendicular to the plies while laying the plies (step 794).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A lightning strike dispersion structure comprising:
   a composite component having an outboard surface, wherein the composite component is electrically nonconductive;
   a metal sheet coupled to and extending across a minority portion of the outboard surface of the composite component, wherein the metal sheet is electrically conductive and comprises a ductile material;
   a metal stud coupled to and in electrical contact with the metal sheet, the metal stud extending completely through the composite component, wherein the metal stud comprises a head and a tip longitudinally opposite the head, wherein the metal stud is electrically conductive and the head of the metal stud is fixedly embedded in the ductile material of the metal sheet; and
   a metal mesh coupled to and extending across a majority portion of the outboard surface of the composite component, wherein the metal mesh is electrically conductive and the majority portion of the outboard surface of the composite component is inclusive of the minority portion of the outboard surface of the composite component such that the metal mesh extends across and is in electrical contact with the metal sheet.

2. The structure of claim 1, wherein the metal mesh is in direct physical contact with the metal sheet.

3. The structure of claim 1, wherein the majority portion of the outboard surface of the composite component has a surface area that is at least 10 times larger than a surface area of the minority portion of the outboard surface of the composite component.

4. The structure of claim 1, wherein the metal mesh is embedded in an exterior surface material of an aircraft.

5. The structure of claim 1, wherein the minority portion of the outboard surface of the composite component has a surface area that is at least 2 times larger than a cross-sectional area of a head of the metal stud.

6. The structure of claim 1, wherein the metal stud, when coupled to the metal sheet, is non-rotatable about a longitudinal axis of the metal stud.

7. The structure of claim 1, wherein the head of the metal stud is a self-clinching head that is coupled to the metal sheet.

8. The structure of claim 1, wherein a head of the metal stud is flush with a surface of the metal sheet.

9. The structure of claim 1, wherein the metal stud is permanently integrated with the composite component.

10. The structure of claim 1, wherein a longitudinal axis of the metal stud extends perpendicular to plies of the composite component.

11. The structure of claim 1, wherein the metal stud is non-structural and thus is free of a structural load.

12. The structure of claim 1, wherein the minority portion of the outboard surface of the composite component has a surface area that is about 1 square inch.

13. A packboard of an aircraft, the packboard comprising:
   a composite housing comprising an inboard surface and an outboard surface, wherein the composite housing is electrically nonconductive;
   a metal sheet coupled to and extending across a minority portion of the outboard surface of the composite housing, wherein the metal sheet is electrically conductive and comprises a ductile material; and
   a metal stud comprising a head and a tip longitudinally opposite the head, wherein:
      the metal stud is electrically conductive;
      the metal stud extends through the composite housing;
      the head of the metal stud is fixedly embedded in the ductile material of the metal sheet such that the metal stud is coupled to and in electrical contact with the metal sheet;
      the tip of the metal stud protrudes from the inboard surface of the composite housing; and
      the tip of the metal stud is configured to be electrically connected to an electrical ground of the aircraft.

14. The packboard of claim 13, further comprising a metal mesh coupled to and extending across a majority portion of the outboard surface of the composite housing, wherein the metal mesh is electrically conductive and the majority portion of the outboard surface of the composite housing is inclusive of the minority portion of the outboard surface of the composite housing such that the metal mesh extends across and is in electrical contact with the metal sheet.

15. The packboard of claim 13, wherein at least the tip of the metal stud is threaded and is configured to couple with a threaded nut for electrically connecting the metal stud to the electrical ground of the aircraft.

16. The packboard of claim 13, wherein the metal stud is permanently integrated with the composite housing.

\* \* \* \* \*